United States Patent [19]

Taubert et al.

[11] 4,328,665
[45] May 11, 1982

[54] LINK FOR STEEL SPROCKET CHAINS

[75] Inventors: Klaus Taubert, Kirchen; Herbert Wehler, Neunkirchen-Salchendorf; Alfred Bald, Siegen, all of Fed. Rep. of Germany

[73] Assignee: Amsted-Siemag Kette GmbH, Betzdorf, Fed. Rep. of Germany

[21] Appl. No.: 26,217

[22] Filed: Apr. 2, 1979

[30] Foreign Application Priority Data

Apr. 5, 1978 [DE] Fed. Rep. of Germany ....... 2814587

[51] Int. Cl.³ .................... B21L 17/00; B23P 17/02; F16G 13/07
[52] U.S. Cl. ........................................ 59/88; 29/415; 59/6; 59/8; 59/13; 59/35 R; 474/206
[58] Field of Search ............ 74/250 R, 245 R, 245 S, 74/250 S, 245 C, 245 LP, 248, 250 L; 29/417, 159.2, 412, 415; 59/5, 6, 8, 35 R, 13, 88; 474/206, 213; 83/32

[56] References Cited

U.S. PATENT DOCUMENTS

| Re. 24,475 | 5/1958 | Siverson | 474/206 X |
| 1,127,072 | 2/1915 | Morse | 59/6 X |
| 1,580,910 | 4/1926 | Layman et al. | 74/250 S |
| 1,693,431 | 11/1928 | Behning | 74/245 S |
| 1,846,635 | 2/1932 | Finley | 83/32 X |
| 1,849,684 | 3/1932 | Morse | 74/250 S |

FOREIGN PATENT DOCUMENTS

| 474203 | 11/1914 | France | 74/250 R |
| 332752 | 7/1930 | United Kingdom | 83/32 |

Primary Examiner—Allan D. Herrmann
Attorney, Agent, or Firm—Toren, McGeady & Stanger

[57] ABSTRACT

Links for steel sprocket chains are each formed of a pair of dodecagon shaped broadened portions joined by a web with parallel sides. When cut from a sheet metal plate the boundary edges of the broadened portions and web of one link are in contact with and at least partially congruent to adjacent links.

2 Claims, 3 Drawing Figures

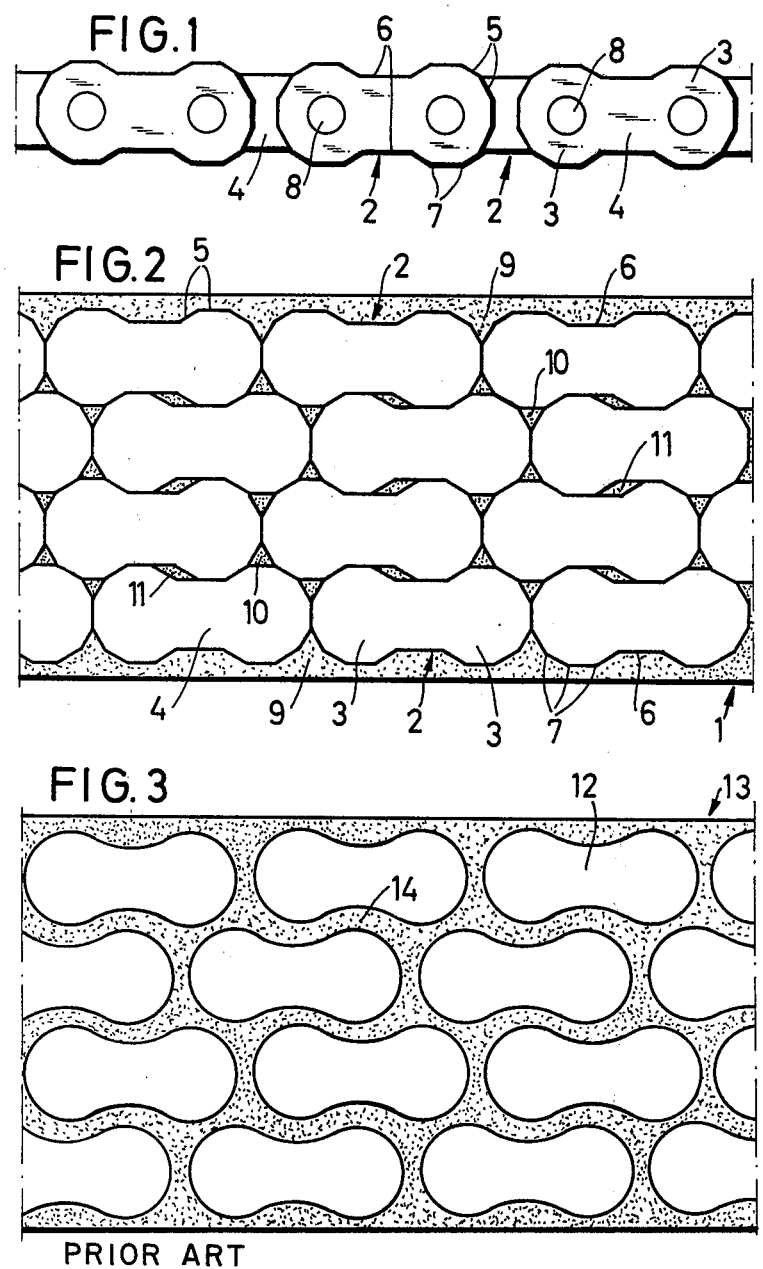
PRIOR ART

LINK FOR STEEL SPROCKET CHAINS

The invention relates to a link which is punched out from sheet metal strips and is intended for steel sprocket chains and has broadened portions, forming eyes for the chain pin and chain sleeve, and a constricted web which interconnects the said broadened portions.

Links of this kind, for example for standardised steel sprocket chains, are embodied with rounded eyes and oppositely rounded constricted portions functioning as the web. Since the dimensions of standardized steel sprocket chains do not permit the rounded portions to be constructed with the same radii it follows that the boundary edges of known links are not congruent when they bear upon each other in offset configuration. Instead, elongated gussets are disposed between the individual links. For this reason it is not possible for known links to be punched out with adjoining surfaces and instead it is necessary to punch such links from a sheet metal strip with distances between the links so that a grid remains between them and cannot be further utilized since it is scrap.

Scrap resulting from the production of conventionally punched links amounts to approximately 40 to 50% of the original material.

It is therefore the object of the invention to provide a steel sprocket chain link which is punched from a sheet metal strip, and results in a substantially lower proportion of scrap due to punching without, however, altering the functionality of the chain or the standardized dimensions.

According to the invention the problem is solved in that the broadened portions and the web which interconnects the portions has straight edges which are at least partially congruent with each other when the links are placed against each other in offset configuration.

In this way it is possible to achieve a substantial surface continuity of the links for the punching operation so that only two edge strips and gussets between the links are produced as scrap.

An embodiment of the link, in which the broadened portions comprise a regular dodecagon and the web has parallel boundary edges which terminate at those corners of the dodecagon between which three of the boundary edges of the dodecagon are situated, is particularly advantageous. This link shape provides the closest possible approach to the standardized dimensions of a conventionally standardized steel sprocket chain and in particular results in an approximately 50% reduction of scrap in punching, compared with the conventional link.

The length of the webs can be equal to the length of the boundary edges of the dodecagon. In this case gussets to be punched out will occur only between the boundary edges of adjoining broadened portions. Advantageously, and while tolerating the appearance of small rhombic gussets, the length of the webs is, however, greater than the length of the boundary edges of the dodecagon so that more slender links can be obtained in this manner.

One embodiment of the invention will be explained hereinbelow by reference to the accompanying drawing in which:

FIG. 1 is a steel sprocket chain with the links according to the invention.

FIG. 2 is a punching pattern of the links according to the invention, and

FIG. 3 is a punching pattern of known, rounded links.

A link 2 according to the invention has broadened portions 3, embodied as a regular dodecagon, with eyes 8 for the chain pins. The broadened portions 3 are interconnected by a constricted web 4 with parallel boundary edges 6 and have boundary edges 5 as well as corners 7 of the dodecagon shaped broadened portions disposed therebetween. Each of the boundary edges 6 of a web 4 terminates on one corner 7 of the dodecagon associated with the broadened portions 3. Three of the boundary edges 5 of the dodecagon would be situated between the corners 7 is this were fully possible at that place. Each link 2 is symmetrical about an axis extending through the centers of the eyes 8 in the broadened portions 3.

FIG. 2 discloses that the links 2 can be punched out with surface continuity from a sheet metal strip 1 because the external contours are substantially congruent if the links are in an offset configuration. Therefore the scrap yielded in punching comprises only one edge strip 9 as well as a triangular gusset 10 between each of the contacting broadened portions 3 and rhombic gussets 11 in the region of the webs 4. If the length of the boundary edges 6 of the webs 4 is equal to the length of the boundary edges 5 of the dodecagonal broadened portions 3, the rhombic gussets 11 are completely eliminated but the links will be shorter than would correspond to their standardized size.

The punching pattern of conventional links 12 for steel sprocket chains shown in FIG. 3 shows that these do not touch each other at any place and are disposed at approximately the same distance from each other at all places. Punching out the links 12 from the plate 13 therefore necessarily results in the production of a residual punching grid 14 which can be utilized only as scrap. Moreover, for a given link size the sheet metal strip 13 must be broader than the sheet metal strip 1 for the links according to the invention. The required sheet metal strip lengths is also greater for the same number of links so that as a consequence a larger sheet metal surface area is required for the same number of links and accordingly a larger amount of scrap is yielded.

I claim:

1. A link punched out of a sheet metal strip for use in steel sprocket chains comprising a pair of spaced broadened portions each containing an eye for chain pins and chain sleeves and a web extending between and interconnecting said broadened portions, said link having an axis extending between and passing through the centers of said eyes wherein the improvement comprises that said link is symmetrical on both sides of the axis extending between and through centers of said eyes, said broadened portions and web consist of rectilinear boundary edges whereby a number of rows of links can be punched from a common plane of a sheet metal strip so that boundary edges of adjacent links can be cut simultaneously with the adjacent broadened portions of said links in the same row disposed in abutting contacting relation along one of said rectilinear boundary edges of each and with the adjacent rows of links disposed in abutting side-by-side relation and the axes thereof disposed in parallel relation and with the links in adjacent rows having said eyes therein disposed in offset relation in the axial direction thereof so that said rectilinear boundary edges of said broadened portions of one link are disposed in abutting contact with said rectilinear boundary edges of said broadened portions and webs of adjacent links in the adjacent rows of links, said broadened portions having the shape of a regular dodecagon and the web has parallel rectilinear boundary edges which terminate at the opposite ends at corners of the dodecagon shaped broadened portions with the spacing between the parallel boundary edges of said web being equal to the space between two of the corners of the dodecagon shaped broadened portion separated by three of the boundary edges of said broadened portion.

2. A link, as set forth in claim 1, wherein the length of said web extending in the axial direction between said broadened portions is greater than the length of one of the boundary edges of the dodecagon shaped boundary portions.

* * * * *